United States Patent Office 3,323,018
Patented May 30, 1967

3,323,018
METAL-ENCLOSED ELECTRICAL PROTECTIVE SYSTEMS
Werner A. Roth, Aargau, Switzerland, assignor to Fabrik Elektrischer Apparate Sprecher & Schuh A.-G., Aargau, Switzerland
Filed Aug. 7, 1964, Ser. No. 388,207
Claims priority, application Switzerland, Aug. 14, 1963, 10,055/63
5 Claims. (Cl. 317—60)

This invention relates to enclosed high-voltage switch plants. Enclosed switching systems are used in order to prevent disturbances caused by the access of dirt, foreign bodies or any living creatures, and to protect the attendants against any contact with live parts. A further advantage of the encasement consists in the little space requirement, particularly when insulating oil or gaseous insulating media are employed. In spite of these advantages, encased high tension-switch plants have hitherto found only few applications in actual practice, since, when defects arise, relatively heavier destructions are possible than in case of open-air switching plants.

It is generally known to safeguard enclosed switching apparatus against destruction by differential protection. This system requires a number of current transformers which must be exactly balanced. Great difficulties are also encountered in separating the plant into individual sections. Furthermore, this system is comparatively expensive.

It is an object of the invention to provide an enclosed high-voltage switch plant having one or more bus bars and outgoing lines, with means for selectively cutting off disconnectors and power switches when ground leaks and short-circuits occur.

According to the invention a casing is provided for enclosing said bus bars, disconnectors and power switches, said casing being divided into a plurality of sections of electrically conductive material insulated against each other and with respect to ground, said sections being connected to ground each by means of a ground contact relay, energization of said relay causing all power switches connected to the same bus bar to be cut off by means of an auxiliary circuit.

The auxiliary circuit for the disconnection of the power switches, can pass over contacts for the actuating members of the associated disconnectors disposed at the side of the bus bar.

Preferably, each single phase line is separately encased together with its disconnectors and power switches. However, an arrangement may also be provided in which a three phase line is enclosed in a single casing.

The invention will now be more particularly described by way of example with reference to the accompanying drawings, in which.

Figure 1:
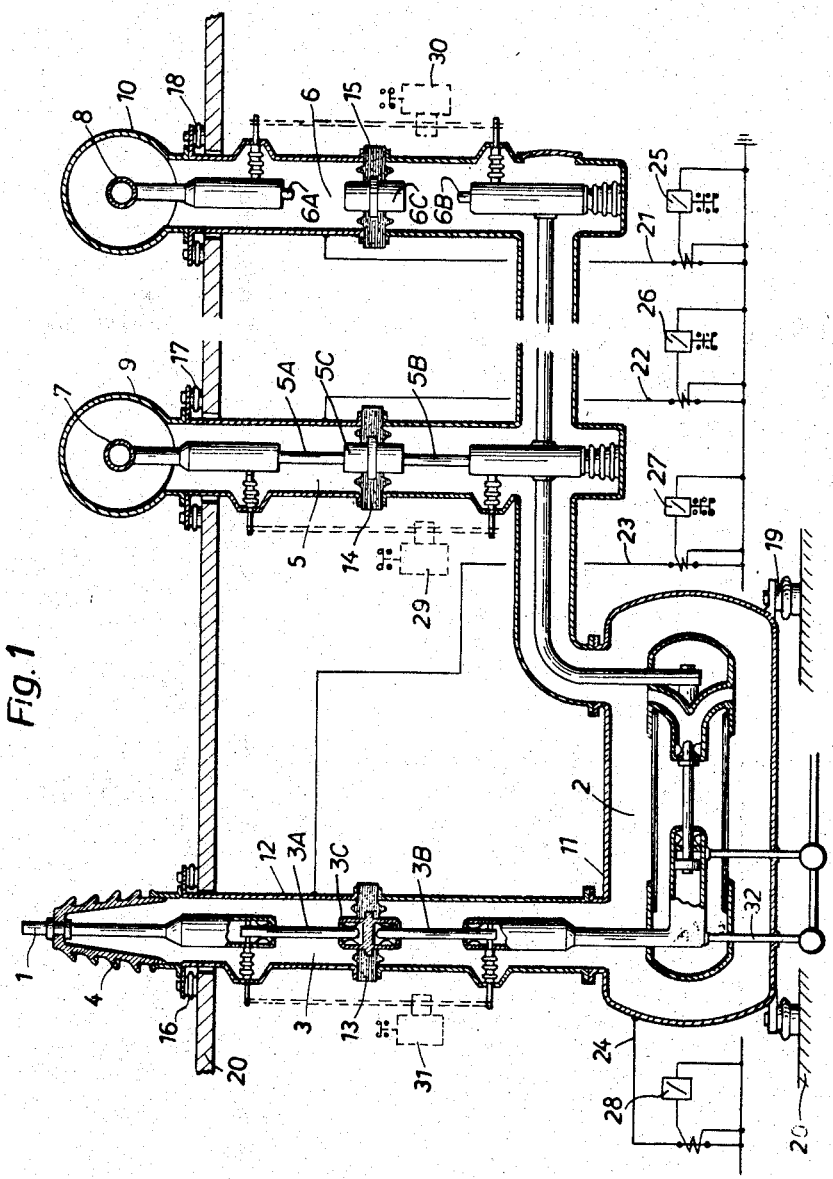
FIGURE 1 is a diagrammatic sectional view of a switching arrangement having two bus bars and one outgoing circuit.

Referring now to FIGURE 1, the outgoing circuit 1 leading through a bushing insulator 4 is connected to the bus bar 7 by the intermediary of a disconnector 3, a power switch 2 and a disconnector 5. It is also possible to selectively provide a connection to the bus bar 8 by way of a disconnector 6, or to any other desired bus bars. The casing is subdivided into three upper sections 9, 10 and 12 and a lower section 11, are separated from each other by means of transverse partitions 13, 14, 15 made of insulating material. The disconnectors 3, 5, 6 have each two halves 3A, 3B, 5A, 5B, 6A, 6B which are electrically connected together by respective connections 3C, 5C, 6C. As illustrated in FIG. 1, these connections pass through and are in physical contact with the insulating partitions 13, 14, 15, whereby arc over is effectively prevented when a fault occurs. The encasement is insulated from the earth 20 by means of insulators 16, 17, 18 and 19. From the individual casing sections 9, 10, 11 and 12, lines 21, 22, 24 and 23, respectively extend to earth over ground contact relays 25, 26, 27 and 28, respectively. The operation of the disconnectors 3, 5 and 6 and of the power switch 2 is effected in known manner by electrically controlled driving units 31, 29, 30 and 32, respectively.

Figure 2:
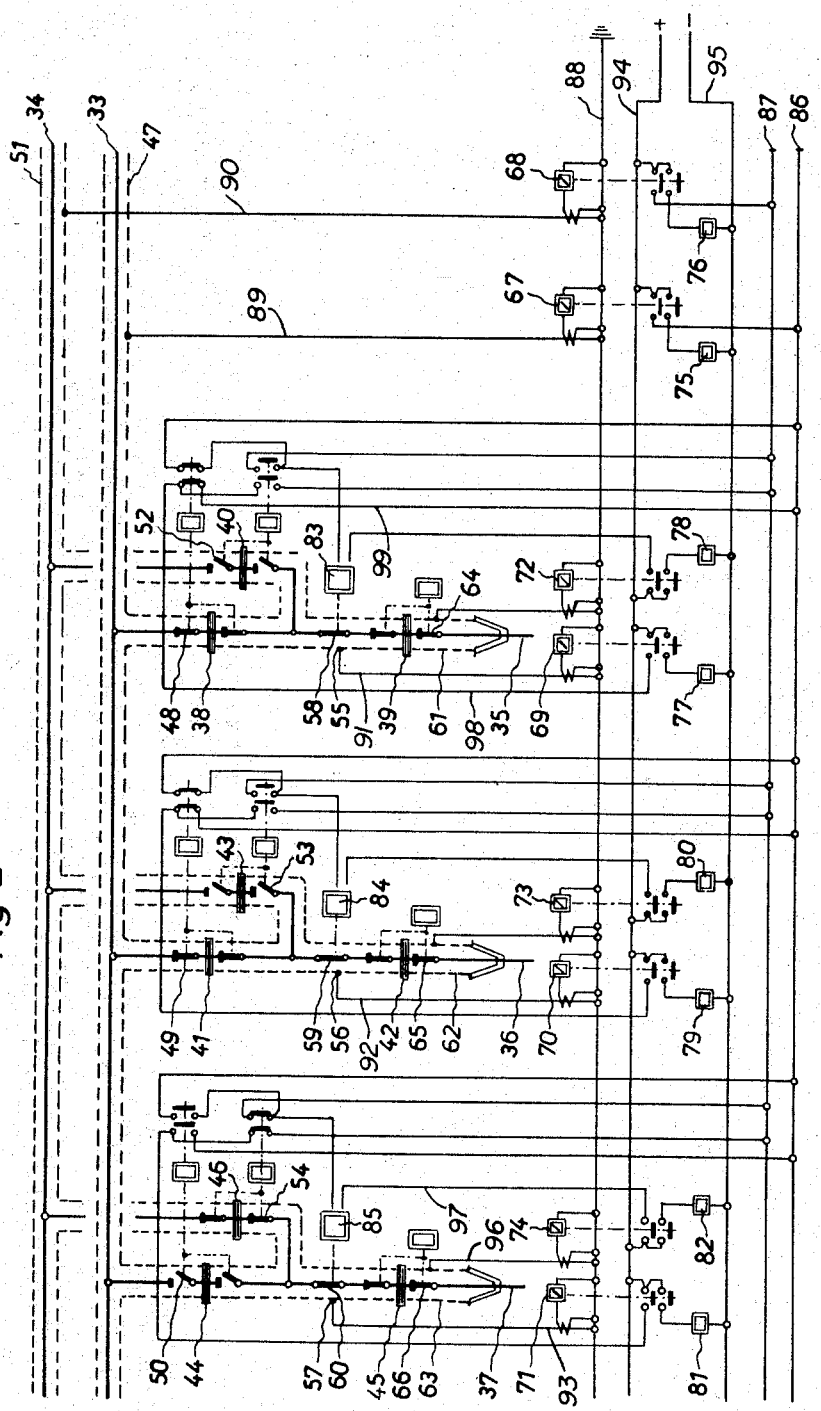
FIGURE 2 shows the wiring diagram of an encased single-pole switching station having two bus bars and three outgoing circuits.

The circuit arrangement according to FIGURE 2 is laid out for two bus bars 33, 34 and for three outgoing lines 35, 36 and 37. The position of the disconnectors is shown so that the lines 35 and 36 are connected to the bus bar 33, while the line 37 is connected to the bus bar 34. The subdivision of the casing corresponds to that shown in FIGURE 1. Partition walls 38, 39, 40 or 41, 42, 43 or 44, 45, 46 delimit the different casing sections which are indicated by dash lines. The arrangement is such that a flash-over of a fault electric arc between separated sections is not possible.

The casing section 47 of the bus bar 33 encloses the disconnectors 48, 49 and 50, while the casing section 51 of the bus bar 34 contains the disconnectors 52, 53 and 54. The power switches 58, 59 and 60 are arranged in the middle sections 55 and 56 and 57. The outer sections 61, 62, 63 contain the disconnectors 64, 65, and 66. The latter are arranged so that their movable switch members are situated on both sides of the partition walls 38, 39 and 40.

The casing sections 47, 51 are connected to ground by associated conductors 89 and 90, the supervision of these conductors being performed by ground contact relays 67 and 68. Likewise, ground contact relays 69, 70, 71 are provided on the ground connections 91, 92 and 93 of the middle casing sections 55, 56 and 57, while ground contact relays 72, 73, 74 are provided for the outer casing sections 61, 62 and 63. The relays are associated with indicating members 75, 76, 77, 78, 79, 80, 81 and 82, respectively. The indicating members are supplied with current from the supply lines 94 and 95 by means of contacts of the relays. Additional contacts of the relays render it possible to connect the positive supply line 94 over ring conduits 86, 87 and contacts of the disconnectors 48, 49, 50 and 52, 53, 54 disposed on the side of the bus bars 33, 34 to the driving units 83, 84, 85 of the power switches.

The mode of operation shall be explained by way of specific examples:

(a) It will be ssumed that an earth leakage occurs in the casing section 63 of the outgoing line 37. A fault current will then flow from the section 63 through conductor 96, to the ground conductor 88 and cause the ground contact relay 74 to respond. The contacts of the relay 74 then connect the indicating member 82 to the supply lines 94, 95. A further contact of the relay 74 closes the current circuit through conductor 97 to the shut-off coil of the driving unit 85 for the power switch 60. The disturbed line section is thereby disconnected from the bus bar 34.

(b) In response to a fault in the casing section 55 of the power switch 58 of the outgoing line 35, the relay 69 will be energised by the conductors 91 and 88. The indicating member 77 starts to flash up. At the same time, the ring line 86 is supplied with a voltage by means of conductor 98, the contacts of the disconnector 48 and conductor 99. All driving units 83, 84 of the power switches 58, 59 which are connected to the same bus bar 33, are fed with current by the ring line 86 and operate the switches to disconnect. The indicating member 77 indicates that the disturbance is situated in the outgoing line 35. In order to be able to switch-in again the undisturbed outgoing line 36, first the disconnectors 48 and 64 of the outgoing line 35 must be shut off.

(c) Any disturbance in the section 47 of the bus bar 33 energizes the relay 67 and causes the indicating member 75 to light up. The ring line 86 feeds the voltage to the driving units 83, 84 of the power switches 58 and 59. The further operation takes place in the same manner as described with respect to (example b).

The invention is not limited to the wiring diagram of the auxiliary current circuits disclosed in FIGURES 1 and 2. In place of open circuit auxiliary contacts closed circuit contacts may also be provided in which case the disconnection of the power switches will be effected for example by opening the corresponding auxiliary current circuits.

I claim:

1. A metal-enclosed high-voltage switching system for protection against faults in an electrical distribution system, including at least one bus bar, at least one outgoing line, at least one disconnecting switch means comprising two halves joined by an electrical connection and connecting said at least one bus bar to said at least one outgoing line, at least one power switch means, an electrically conductive metal housing surrounding said at least one bus bar, disconnecting switch means and power switch means and insulated from ground, individual actuating means for operation of said at least one disconnecting switch means and said at least one power switch means, and at least one auxiliary circuit for controlling said actuating means: the improvement wherein said housing comprises a first section surrounding said at least one bus bar and the half of said at least one disconnecting switch means connected thereto, and a terminating section surrounding the other half of said at least one disconnecting switch means and the portion of the bus bar connected thereto to said outgoing line; and including means for insulating said first section from said terminating section; and a separate relay means connected between each of said first and terminating sections and ground for individually grounding a respective section when a fault occurs within the section.

2. The combination as defined in claim 1, including a plurality of said disconnecting switch means connecting said at least one bus bar to said at least one outgoing line; said housing including an individual second section surrounding the opposed halves of each to successive disconnecting switch means; insulating means for insulating each said second section from each other and from said first section and from said terminating section; and a separate relay means connected between each of said second sections and ground for individually grounding a respective second section when a fault occurs within the section.

3. The combination as defined in claim 1, wherein the electrical distribution system is multiphase, at least one disconnecting switch means and at least one power switch means for each phase, and a separate said housing having said first and terminating sections for each said phase.

4. The combination as defined in claim 1, wherein the electrical distribution system is multiphase, and all phases are enclosed within said housing.

5. The combination as defined in claim 1, wherein said electrical connection joining the two halves of said at least one disconnecting switch means passes through and in physical contact with said means for insulating said first section from said terminating section.

References Cited

UNITED STATES PATENTS

| | | | |
|---|---|---|---|
| 2,697,217 | 12/1954 | Jeffers | 317—18 X |
| 2,929,963 | 3/1960 | Kaestle | 317—28 X |
| 3,233,151 | 2/1966 | Fisher | 317—18 |
| 3,259,802 | 7/1966 | Steen | 317—18 |

FOREIGN PATENTS

| | | |
|---|---|---|
| 38,857 | 7/1936 | Netherlands. |

MILTON O. HIRSHFIELD, *Primary Examiner.*

R. V. LUPO, *Assistant Examiner.*